United States Patent [19]
Noble

[11] Patent Number: 5,687,537
[45] Date of Patent: Nov. 18, 1997

[54] MODULAR ANTENNA POLE

[75] Inventor: Myron C. Noble, Plymouth, Ind.

[73] Assignee: Pi Rod Inc., Plymouth, Ind.

[21] Appl. No.: 653,018

[22] Filed: May 24, 1996

[51] Int. Cl.⁶ .................................................. E04H 12/00
[52] U.S. Cl. ........................ 52/726.3; 52/726.1; 403/337; 411/169
[58] Field of Search ........................... 52/726.4, 726.1, 52/726.3; 403/337, 335; 411/169, 973

[56] References Cited

U.S. PATENT DOCUMENTS

| | | | |
|---|---|---|---|
| 1,404,831 | 1/1922 | Buckner | 52/223.1 X |
| 2,250,448 | 7/1941 | Edwards | 403/337 |
| 3,345,826 | 10/1967 | Hignite | 52/726.3 |
| 3,369,331 | 2/1968 | Deskey et al. | 52/726.4 X |
| 3,421,781 | 1/1969 | Spurk | 52/726.1 |
| 3,793,794 | 2/1974 | Archer et al. | 52/726.4 X |
| 4,086,012 | 4/1978 | Buckley | 403/337 |
| 4,721,008 | 1/1988 | Stoops et al. | 403/337 X |
| 4,949,525 | 8/1990 | Weaver | 52/726.4 X |
| 5,333,436 | 8/1994 | Noble | 52/726.3 |

FOREIGN PATENT DOCUMENTS 358127  10/1931  United Kingdom ............... 411/169

Primary Examiner—Carl D. Friedman
Assistant Examiner—Beth Aubrey
Attorney, Agent, or Firm—Baker & Daniels

[57] ABSTRACT

An improved modular antenna pole comprised of a series of aligned cylindrical sections of progressively smaller diameters. Each of the sections includes a top and bottom transverse surface and a circular flange attached to the top and bottom transverse surfaces, respectively, to permit adjacent sections to be bolted together using conventional attachment bolts through a series of complementally spaced mating bores through the flanges. Each of the bolts is held in place by a retention clip which allows the bolts to be pre-installed. A stop tab located inside the sections prevents the bolts from rotating during tightening, and eliminates the use of a conventional jam nut. This improved design also allows the bottom flange of a higher section to rest directly on the top flange of a lower section, resulting in easier assembly and a straighter and more stable pole. Finally, the internal stop members eliminate the need for access holes in each section, and thus the present modular antenna pole is easier and safer to assemble and less susceptible to rust and corrosion, which means faster, safer installation along with less maintenance and longer life.

18 Claims, 4 Drawing Sheets

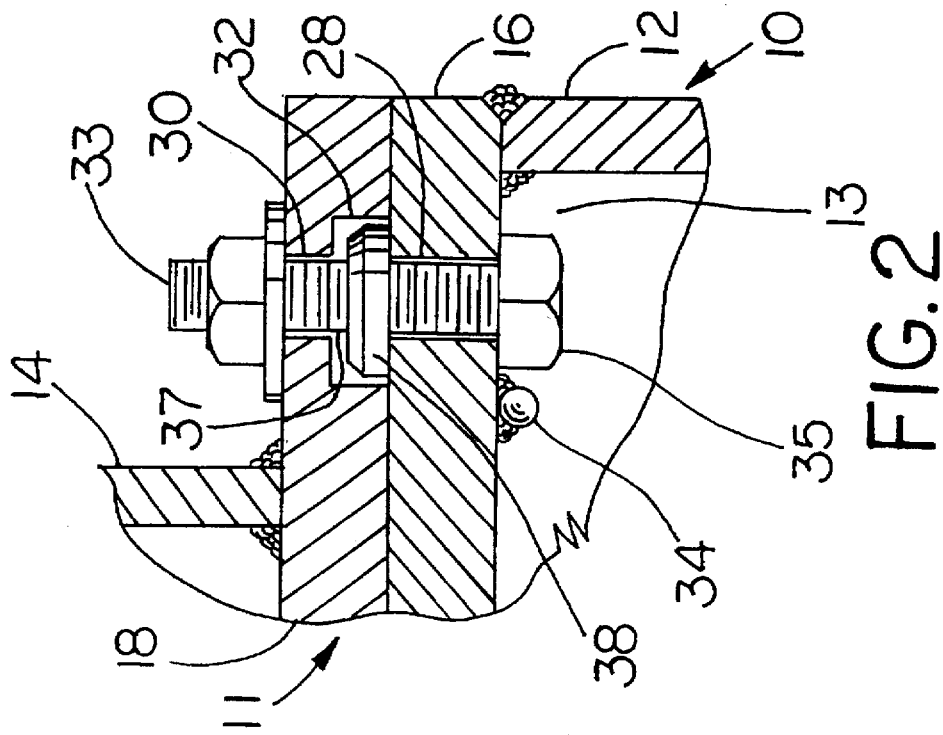
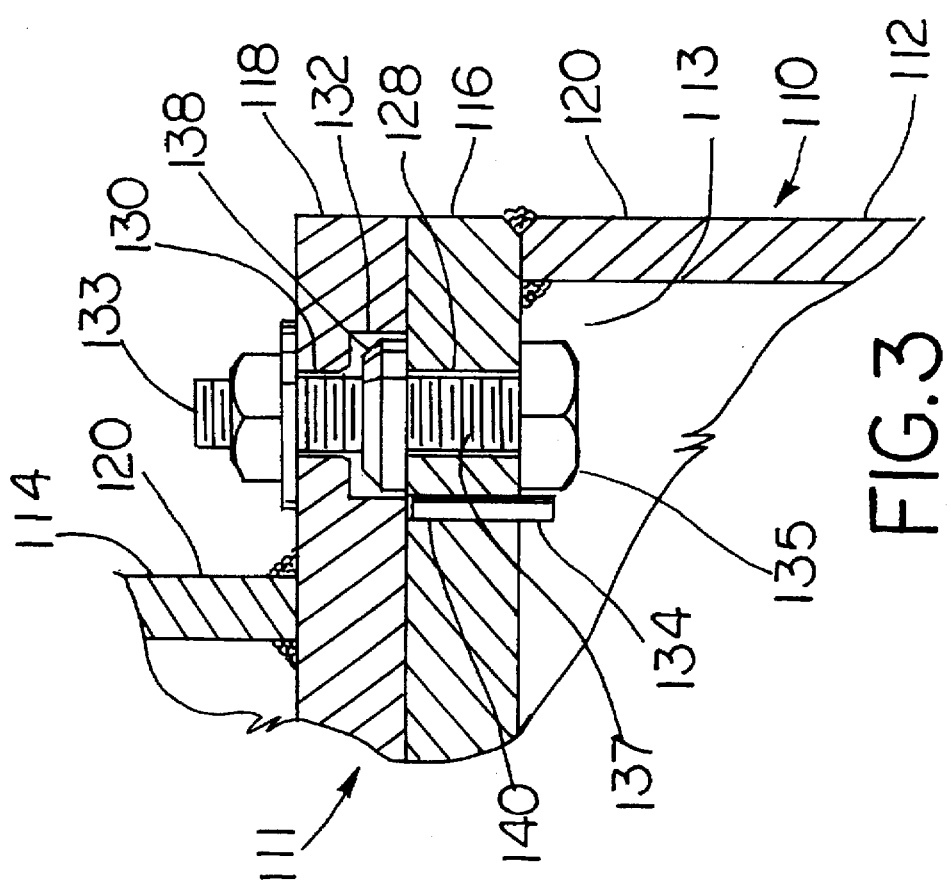

MODULAR ANTENNA POLE

The present invention relates to modular antenna poles. More specifically, the present invention relates to an improved connection between adjacent sections of modular antenna poles that facilitates easier installation, improved stability, and less maintenance.

BACKGROUND OF THE INVENTION

Antenna poles and towers have long been used in the transmission and reception of radio and television signals. Presently, the demand for such poles has been driven upward by the rise in popularity of cellular telephones and other uses of microwave transmission. Such poles generally range in height from 80 to 220 feet.

In the past, many different designs were used. One approach was to build a truss like, open webbed structure fabricated from metal tubing or bars. This truss design was intended to be lightweight and have a favorable wind profile due to the generally open design. However, this design required frequent painting to protect it from corrosion and was very labor intensive to erect and therefore is not suitable for the high number of installations required by a microwave network.

Another prior art design used a central vertical pole supported and stabilized by a system of steel guy wires. Like the truss design, this method was very labor intensive and thus expensive to install and hard to maintain. Also, this design required a very large area because the steel guy wires extend from the pole horizontally a distance nearly equal to the height of the tower, and thus the builder had to purchase or lease a great deal of land surrounding the pole to anchor the guy wires. This shortcoming rendered the cable stayed design too costly for the high number of installations required by a cellular network.

In order to address the above problems, modular antenna poles or monopoles were developed. The original modular poles used gradually tapered segments, each of which had a smaller diameter at the top than at the bottom. Thus, the diameter of the bottom of one segment matched the diameter of the top of the adjacent lower segment. Although the need for guy wires was eliminated, the tapered pipe sections required by this design proved to be very costly to produce and difficult to secure to each other.

One improvement to the modular design, as disclosed in U.S. Pat. No. 5,333,436, was to use cylindrical segments having the same diameter at the top and the bottom, in which the diameter of each succeeding segment gradually "steps down" as the pole gets higher. This design had the advantage of using straight, non-tapered pipe sections, which were less expensive than the more complicated tapered sections. Thus, the "step down" construction provided a gradually tapered pole using straight pipe sections for each segment.

Unfortunately, this approach also has a number of drawbacks. In order to facilitate installation, the bolts at the top of each segment must be secured in place in order to properly align the next succeeding segment. Because the bolts used to connect the segments require a jam nut to keep the bolt in place and to prevent rotation during tightening, the flange at the top of each segment is recessed slightly within the top of each pipe section to provide clearance for the jam nut.

Occasionally, however, when the adjacent segments are in place and a nut is threaded onto the bolt and tightened, one or more of the jam nuts may spin. When this happens it is impossible to properly torque the nut and the upper segment must be removed, the jam nut must be re-tightened, and the upper segment must then be repositioned by crane and bolted in place. This drawback significantly increases installation costs and needlessly endangers the lives of the installation crew.

One approach to this problem is to cut an access hole in the upper portion of the pipe section adjacent each of the bolts, and then have a worker simply secure each bolt head with a wrench while the corresponding nut is torqued in place. However, this approach weakens the structural properties of the pipe section in a critical area, and also provides an avenue for the entry of dirt, water, and other contaminants that can damage and ultimately destroy the pole. Moreover, this method is much more labor intensive, not to mention more dangerous, because of the need for a second worker positioned high on the pole while the segments are bolted together.

Also, because the top flange is recessed within the pipe section, the bottom flange for the adjacent upper segment rests on the top edge or rim of the lower pipe section. This too has a number of drawbacks. First, because the top flange must be positioned inside the pipe section and then welded in place from above and below, each segment is more difficult and costly to fabricate. Second, because the top edge of the pipe section is seldom perfectly perpendicular to the longitudinal axis of the pipe section, each coupling is frequently crooked or slightly skewed. Thus, the adjoining segments are not coaxial, which alters the stresses on the joint and detrimentally affects the aesthetics of the installed pole.

Accordingly, there is a need for an improved modular antenna pole having a more reliable and secure coupling between adjacent segments, and that ensures that all of the segments are coaxial and properly aligned.

SUMMARY OF THE INVENTION

The improved antenna pole of the present invention is stronger, easier and safer to install, and less prone to corrosion and other degradation than are prior art modular poles. The present invention also ensures that each segment is properly aligned and coaxial with the adjacent segments.

The present modular pole uses a top and bottom ring or flange attached to the top and bottom, respectively, of adjacent segments. The top and bottom flanges have a series of corresponding bores so that the flanges can be bolted together. The connecting bolts are retained in the top flange of each segment without using a conventional jam nut, and a separate internal member is used to prevent rotation of the bolt head during tightening. Thus, the need for a recessed flange to accommodate a conventional jam nut is eliminated, as is the need to rely on the jam nut to prevent rotation of the bolt head during installation.

The present invention uses a "keeper" or retention member that holds the connecting bolts in the bores in the top flange, and when the pole is assembled the keeper fits into a small counterbore in the bottom flange, which thus allows a flush fit between the flanges. Also, the top portion of each segment includes an internally mounted stop pin or bar that prevents the bolts from rotating during tightening, which eliminates the need for jam nuts and/or access holes. Thus the pole is safer and easier to assemble, less susceptible to rust and corrosion, and more aesthetically pleasing than prior art poles.

Finally, the placement of the top flange on top of the pipe section, rather than recessed in the pipe section, diminishes the effect of irregular pipe sections. The top and bottom flanges are welded to the ends of the pipe sections using a jig, so that the surface of each flange is oriented perpendicular to the longitudinal axis of the pipe section, regardless of minor irregularities in the ends of the pipes. Thus the bottom flange of an upper segment rests flush on the top flange of the lower segment, rather than on the irregular edge or rim of the lower segment. Therefore, each joint or coupling is square, and the assembled pole is straighter, stronger, and more stable than prior art modular poles.

Accordingly, it is an object of this invention to provide an improved modular antenna pole that is easier to fabricate than prior art antenna pole designs.

It is another object of this invention to provide an improved antenna pole that does not require jam nuts or access holes at the joints between adjacent sections.

Another object of this invention is to provide an improved antenna pole that is faster and easier to erect than prior art designs antenna pole designs.

A still further object of this invention is to provide a modular antenna pole that is straighter and has stronger connections between adjacent segments than do prior art modular designs.

These and other objects of the invention will become readily apparent to those skilled in the art upon a reading of the following description.

BRIEF DESCRIPTION OF THE DRAWINGS

FIG. 2 is a fragmentary elevational view in section of the modular antenna pole shown in FIG. 1, illustrating the details of the joint between adjacent sections;

FIG. 3 is a fragmentary elevational view in section of the modular antenna pole shown in FIG. 1, but illustrating an alternative joint detail;

DETAILED DESCRIPTION OF THE INVENTION

Figure 1:
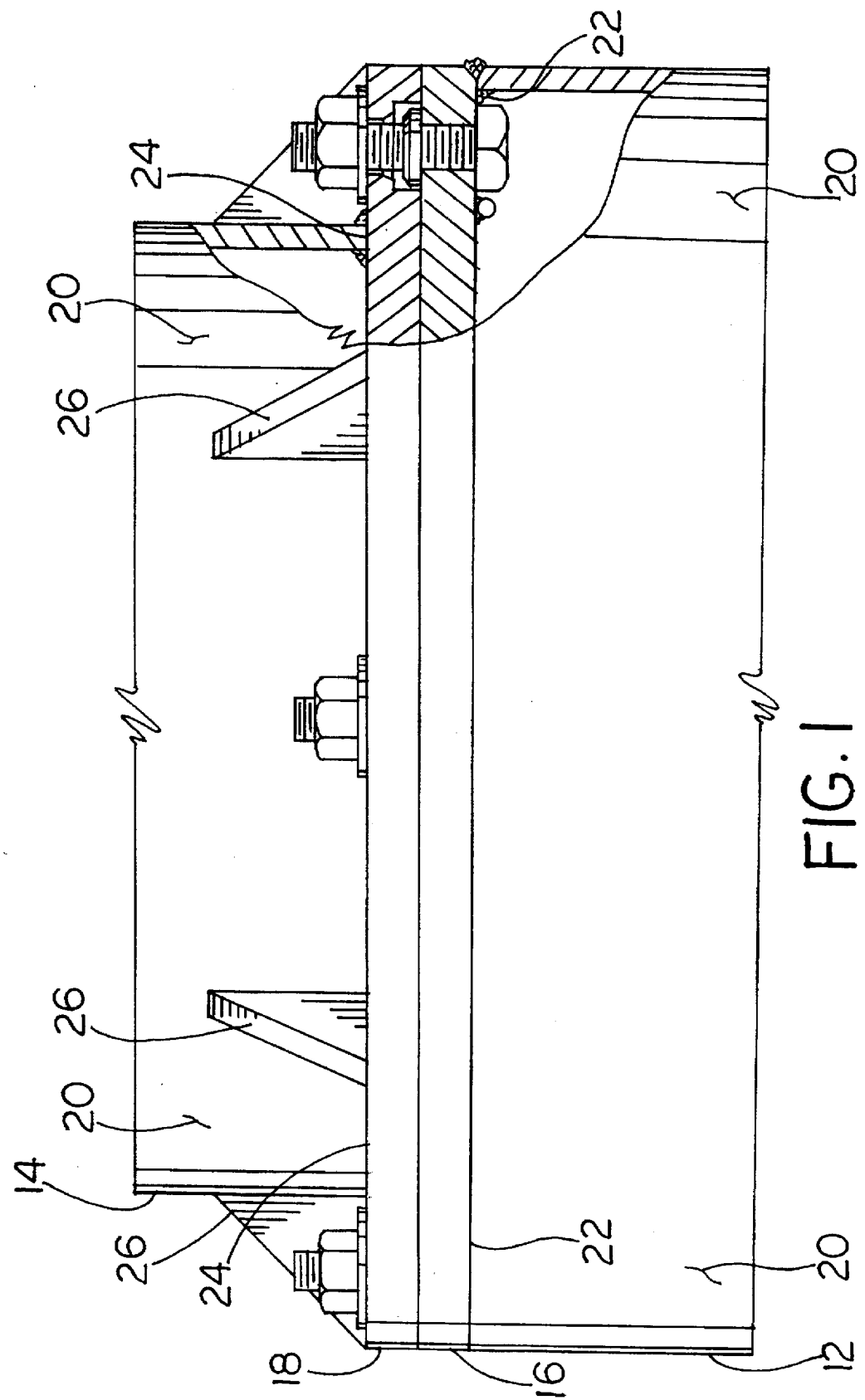
FIG. 1 is a fragmentary elevational view, partly in section, of the modular pole of the present invention illustrating the joint between adjacent sections.
Figure 4:
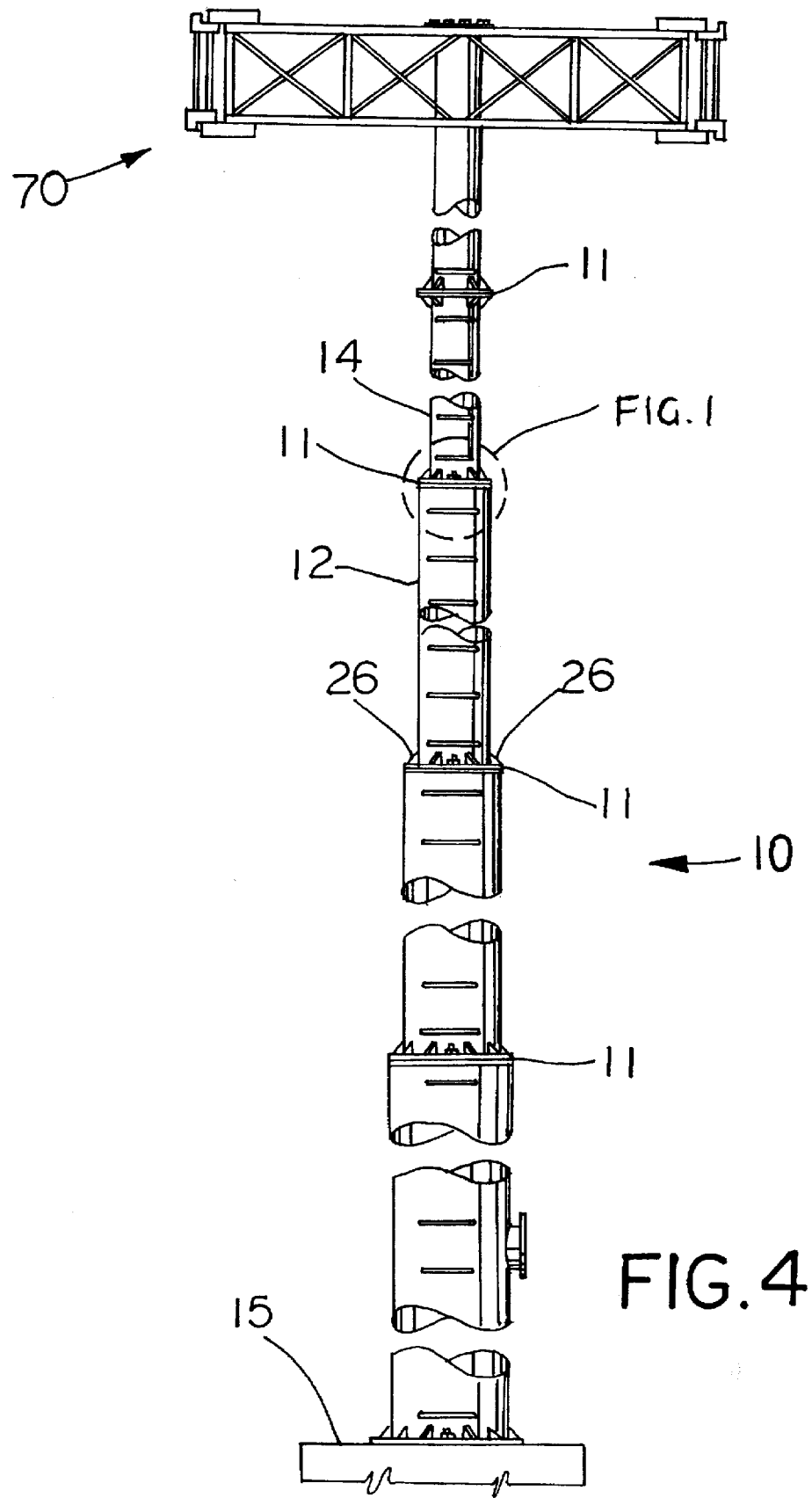
FIG. 4 is a fragmentary elevational view of a modular antenna pole incorporating the features of the present invention and having a typical antenna arrangement attached to the top section of the pole.

The embodiment described herein is not intended to limit the scope of the invention to the precise form disclosed. Rather, the embodiment has been chosen and described to explain the principles of the invention and its application and practical use to best enable others skilled in the art to follow its teachings.

Referring now to the drawings, a modular antenna pole according to the present invention is generally referred to by the reference numeral 10, and consists of a series of joints 11 for connecting a series of aligned cylindrical sections. Antenna platform 70 is supported at the top of pole 10, and platform 70 may take on a variety of sizes and shapes depending on the type of antenna system being used. Each joint 11 connects a lower cylindrical section 12 to a higher cylindrical section 14. The diameter of each higher section 14 in the series is smaller than the diameter of the adjacent lower section 12, so that the diameter of the modular pole 10 gradually decreases in step-down fashion at each joint 11 as the height of the pole 10 increases. For purposes of illustration, only one joint 11 will be described, but the principle is the same at each joint in the series.

Sections 12, 14 each include a top flange 16 and a bottom flange 18, which permits bottom flange 18 of higher section 14 to rest on and be bolted to top flange 16 of adjacent lower section 12. Each section 12, 14 also includes outer circumferential surface 20, and top and bottom transverse surfaces 22, 24 respectively. Top and bottom flanges 16, 18 are welded or otherwise attached or affixed directly to top and bottom transverse surfaces, respectively. Preferably, a jig or other fabrication device is used to ensure that top and bottom flanges 16 and 18 are oriented perpendicular to the longitudinal axis of each cylindrical section, which eliminates the detrimental effect of any irregularities or defects in transverse surfaces 22, 24. Finally, at each joint 11, the diameter of top flange 16 of lower section 12 is substantially the same as the diameter of bottom flange 18 of adjacent higher section 14.

Figure 5:
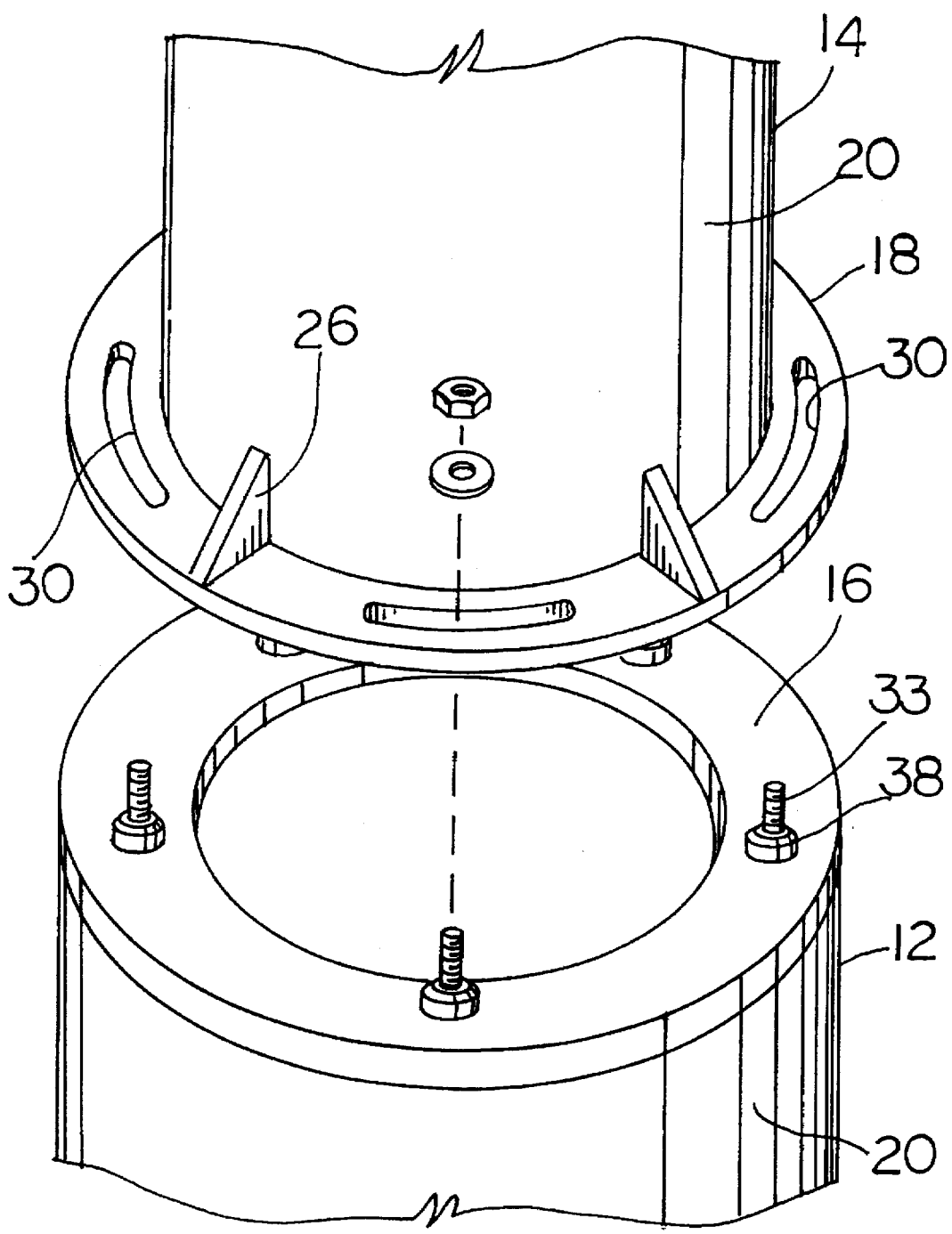
FIG. 5 is a fragmentary exploded view in perspective illustrating the joint between adjacent sections.

As shown in FIGS. 1 and 5, top and bottom flanges 16, 18 are ring shaped. The base of pole 10 is similar in shape to bottom flange 18, except that bottom flange is bolted directly to a base or ground anchor 15 as is conventional in the industry. For purposes of structural strength, bottom flange 22 includes a series of gusset plates 26 extending radially outwardly from outer circumferential surface 20, and gusset plates 26 are welded or otherwise attached to outer circumferential surface 20 and the upwardly facing surface of bottom flange 18.

Top and bottom flanges 16, 18 include a series of complementally spaced top and bottom bolt holes or mating bores 28, 30, respectively. The number of mating bores required depends on the diameter of the sections being bolted together, but in the case of large sections it is not unusual to have 50-60 bolts. Bottom bores 30 may be slotted as shown in FIG. 5, in order to simplify alignment and placement of higher section 14 on lower section 12. Bottom bores 30 include a downwardly facing counterbore 32. A series of threaded hex bolts 33 having head 35 and shank 37 are positioned through bores 28, 30 so that each head 35 is disposed within the upper portion 13 of lower section 12. Head 35 abuts the downwardly facing portion of top flange 16, and each shank 37 protrudes upwardly through bore 28 of top flange 16. Stop member or bar 34 is welded or otherwise attached to the downwardly facing portion of top flange 16 adjacent each top mating bore 28, and threaded retention clip 38 secures each bolt 33 in top bores 28 prior to placement of higher section 14 on lower section 12. Retention clip 38 fits within counterbore 32 in bottom flange 18 so that bottom flange 18 rests flush on top flange 16 when higher section 14 is in place on lower section 12.

In operation, the modular pole is assembled in place by first securing the lowermost section to the base 15. The upper portion 13 of each section would already have a series of hex bolts 33 upwardly disposed through mating bores 28, with each bolt 33 being held securely in place by retention clip 38. An adjacent higher section 14 is placed on top of lower section 12 by aligning bottom mating bores 30 with shanks 37 of bolts 33, so that bottom flange 18 comes to rest on top flange 16. Retention clip 38 prevents bolt 33 from being pushed downwardly through mating bore 28, and counterbore 32 provides room to accommodate retention clip 38 so that the flanges are flush with each other. With higher section 14 in place, a conventional threaded hex nut, along with a conventional flat washer and/or lock washer is placed on bolt 33 and tightened. During tightening, stop bar 34 prevents head 35 of bolt 33 from rotating. Accordingly, there is no need for an access hole to place a wrench on head 35 or for a jam nut to prevent rotation of bolts 33 during tightening. The process of placing a higher section on a lower section to form joint 11 is then repeated, until pole 10 reaches the desired height, after which antenna platform 70 is bolted in place on top of pole 10.

FIG. 3 shows another embodiment of the present invention, in which the same or similar elements are given the same reference numbers, but increased by 100. A modular antenna pole 110 consists of a series of joints 111 for connecting a series of lower cylindrical sections 112 to higher cylindrical sections 114. Sections 112, 114 each include a top flange 116 and a bottom flange 118, and each section 112, 114 includes outer circumferential surface 120, and top and bottom transverse surfaces 122, 124 respectively. Top and bottom flanges 116, 118 include a series of complementally spaced top and bottom bolt holes or mating bores 128, 130, respectively. Bottom bores 130 include a downwardly facing counterbore 132, and a series of threaded hex bolts 133 having head 135 and shank 137 are positioned through bores 128, 130 so that each head 135 is disposed within the upper portion 113 of lower section 112. Retention clip 138 retains bolt 133 in position in bore 128, and retention clip 138 is received within counterbore 132. Head 135 abuts the downwardly facing portion of top flange 116, and each shank 137 protrudes upwardly through bore 128 of top flange 116. One or more secondary bores 140 is drilled through top flange 116 immediately adjacent each top mating bore 128, and stop pin 134 is frictionally disposed in bore 140, so that upon tightening of a nut onto bolt 133, head 135 of bolt 133 contacts stop pin 134, thereby preventing rotation of bolts 133.

It should be understood that the above description does not limit the invention to the form disclosed, but may be modified within the scope of the following claims.

What is claimed:

1. A modular antenna pole comprising:
    a series of aligned cylindrical sections of upwardly decreasing diameters, adjacent sections of said series each including a top circular flange and a bottom circular flange, each of said sections including an outer circumferential surface and top and bottom transverse surfaces, said top flange being secured to the top transverse surfaces of each section, said bottom flange being secured to the bottom transverse surfaces of each section and extending radially outwardly from said outer circumferential surface, to permit a bottom flange of a higher section to rest on a top flange of a lower section, said top and bottom flanges including a plurality of complementally spaced mating bores so that adjacent sections can be bolted together.

2. The pole of claim 1 wherein the outer diameter of each said section is substantially equal to the outer diameter of said top flange attached to each said section.

3. The pole of claim 1 wherein the outer diameter of each said section is smaller than the outer diameter of said bottom flange of each said section.

4. The pole of claim 1 wherein the outer diameter of said top flanges is substantially equal to the diameter of said bottom flange of an upwardly adjacent section.

5. The pole of claim 1, including a retention member for securing a bolt in each of said mating bores, each of the bolts being disposed so that the heads of the bolts are disposed inside the upper portion of each of said sections, and wherein each of said mating bores in said top flanges includes a downwardly facing counterbore sized to receive said retention member so that each of said bottom flanges rests flush on the top flange of an adjacent section.

6. The pole of claim 5, wherein said retention member is a threaded nut.

7. The pole of claim 5, including a stop member secured to the downwardly facing portion of each of said top flanges adjacent said mating bores, so that contact between the heads of the bolts and said stop members prevents rotation of the bolts.

8. The pole of claim 7, wherein each of said top flanges includes one or more secondary bores adjacent said mating bores, and wherein said stop members are stop pins frictionally disposed within said secondary bores so that a portion of said stop pins protrudes through said top flanges adjacent the heads of the bolts.

9. The pole of claim 7, wherein each of said top flanges includes one or more secondary bores adjacent said mating bores, and wherein said stop members are stop pins frictionally disposed within said secondary bores so that a portion of said stop pins protrudes through said top flanges adjacent to heads of the bolts.

10. A modular antenna pole comprising:
    a series of aligned cylindrical sections of upwardly decreasing diameters, each of said sections including a top portion and a bottom portion;
    a top circular flange and a bottom circular flange attached to said top portion and said bottom portion, respectively, of each of said sections, said top and bottom flanges including a plurality of complementally spaced mating bores to permit a top flange of a lower section to be bolted to a bottom flange of a higher adjacent section so that said bottom flange rests on said top flange; and
    a plurality of stop members disposed within said top portion of each of said sections adjacent said mating bores, said stop members constituting means for preventing rotation of attachment bolts positioned upwardly in said mating bores for securing adjacent sections to each other, so that a nut can be threaded onto each of the attachment bolts and tightened without rotating the attachment bolts.

11. The pole of claim 10, wherein each of said mating bores includes a counterbore in the downwardly facing surface of said bottom flanges, and a retention member sized to be received in said counterbore for retaining the attachment bolts in said mating bores prior to securing adjacent sections together yet allowing said bottom flange to rest flush on the top flange of an adjacent section.

12. The pole of claim 10 wherein the outer diameter of each said section is substantially equal to the outer diameter of said top flange attached to each said section.

13. The pole of claim 10 wherein said bottom flange of each said section radiates outwardly from said outer circumferential surface.

14. The pole of claim 10 wherein the outer diameter of each of said top flanges of a lower section is substantially equal to the outer diameter of said bottom flange of a higher adjacent section.

15. The pole of claim 10, including stop members secured to the downwardly facing portion of said top flanges adjacent said mating bores, so that the head of an attachment bolt positioned in said mating bore will contact at least one of said stop members thereby preventing rotating of the attachment bolts when a threaded nut is applied to the attachment bolts.

16. The pole of claim 11, wherein said retention member is a threaded nut, said threaded nut being sized to fit within said counterbore.

17. A modular antenna pole comprising:

a series of aligned cylindrical sections of upwardly decreasing diameters, adjacent sections of said series each including a top circular flange and a bottom circular flange, each of said sections including an outer circumferential surface and top and bottom transverse surfaces, said top flange being secured to the top transverse surfaces of each section, said bottom flange being secured to the bottom transverse surfaces of each section and extending radially outwardly from said outer circumferential surface so that a bottom flange of a higher section rests on a top flange of a lower section, said top and bottom flanges including a plurality of complementally spaced mating bores so that adjacent sections can be bolted together;

a retention member for securing a bolt in each of said mating bores, each of the bolts being disposed so that the heads of the bolts are disposed inside the upper portion of each of said sections, and wherein each of said mating bores in said top flanges includes a downwardly facing counterbore sized to receive said retention member so that each of said bottom flanges rests flush on the top flange of an adjacent section;

each of said top flanges including one or more secondary bores adjacent said mating bores; and stop pins frictionally disposed within said secondary bores so that a portion of said stop pins protrudes through said top flanges adjacent the heads of the bolts in a position to contact the heads of the bolts to thereby prevent rotation of the bolts upon application of a nut to each of the bolts.

18. A modular antenna pole comprising:

a series of aligned cylindrical sections of upwardly decreasing diameters;

a top circular flange and a bottom circular flange attached to the top portion and bottom portion, respectively, of each of said sections, said top and bottom flanges including a plurality of complementally spaced mating bores to permit a top flange of a lower section to be bolted to a bottom flange of a higher adjacent section;

each of said top flanges including one or more secondary bores adjacent said mating bores; and a plurality of stop pins frictionally disposed within said secondary bores and protruding from the downwardly facing portion of said top flanges, said stop pins for preventing rotation of attachment bolts positioned in said mating bores for securing adjacent sections to each other, a portion of said stop pin protruding through said top flanges in a position to contact the head of the attachment bolt, so that a nut can be threaded onto each of the attachment bolts and tightened without rotating the attachment bolts.

* * * * *